March 26, 1968 L. J. BUCHMANN 3,374,891

AUTOMATIC WATER SOFTENING APPARATUS

Filed May 18, 1964 6 Sheets-Sheet 1

FIG. 1

INVENTOR.
LOUIS J. BUCHMANN
BY
Joseph P. Gastel
ATTORNEY

March 26, 1968  L. J. BUCHMANN  3,374,891
AUTOMATIC WATER SOFTENING APPARATUS
Filed May 18, 1964  6 Sheets-Sheet 2

INVENTOR.
LOUIS J. BUCHMANN
BY
Joseph P. Gastel
ATTORNEY

March 26, 1968 L. J. BUCHMANN 3,374,891
AUTOMATIC WATER SOFTENING APPARATUS
Filed May 18, 1964 6 Sheets-Sheet 3

INVENTOR.
LOUIS J. BUCHMANN
BY
Joseph P. Gastel
ATTORNEY

INVENTOR.
LOUIS J. BUCHMANN
BY
Joseph P. Gastel
ATTORNEY

March 26, 1968 L. J. BUCHMANN 3,374,891
AUTOMATIC WATER SOFTENING APPARATUS
Filed May 18, 1964 6 Sheets-Sheet 5

INVENTOR.
LOUIS J. BUCHMANN
BY
Joseph P. Gastel
ATTORNEY

United States Patent Office 3,374,891
Patented Mar. 26, 1968

3,374,891
AUTOMATIC WATER SOFTENING APPARATUS
Louis J. Buchmann, Buffalo, N.Y., assignor to Aquionics Corporation, Buffalo, N.Y., a corporation of New York
Filed May 18, 1964, Ser. No. 368,024
9 Claims. (Cl. 210—126)

ABSTRACT OF THE DISCLOSURE

Automatic water softening apparatus which includes an outer tank for housing brine, said outer tank containing an inner tank for housing zeolites, a regeneration valve mounted on the zeolite tank, a brine valve assembly mounted within the brine tank, and associated conduits for effecting communication between the various tanks and valves. The brine valve assembly includes a columnar tube for shielding a float member from brine pellets, and a poppet valve mounted on a common shaft with the float member for terminating flow of water from a first conduit leading into the brine tank when a predetermined level is reached in the brine tank. In addition, a poppet valve is loosely mounted on the common shaft for terminating flow from said brine tank into said first conduit leading to the zeolite tank when the level drops to a predetermined value. In addition, a handle is mounted on the brine valve and is accessible from outside of the tank for varying the shut-off level of liquid in the brine tank. The regeneration valve includes a slide valve movable between a water softening and a regenerating position upon the actuation of a solenoid, and the regeneration valve includes associated conduits for effecting communication between: the brine tank and the zeolite tank; a hard water source and the zeolite tank; and the hard water source and the brine tank.

---

The present invention relates to improved automatic water softening apparatus using zeolites.

Water softening by the use of zeolites is well known. In this process, hard water to be softened is passed through a bed of zeolite granules which removes water-hardening minerals by a process of ion exchange. After the zeolite bed has been subjected to a predetermined amount of hard water, it becomes exhausted, and regeneration of the zeolite granules is required, which is accomplished by passing a brine solution through it. Thereafter the brine is removed by flushing the zeolite bed with clear water. The foregoing water softening and regeneration steps are periodically alternated.

In the past, automatic water softening equipment was complex. This in turn caused it to be initially costly and subject to subsequent malfunctions in use with attendant expense of repairs. The complexity was due primarily to the structure of the regeneration valve, which routed hard water through the zeolite bed during water softening and passed brine through the zeolite bed during regeneration. Furthermore, in previous types of automatic water softening equipment, the brine valves, which admitted only a predetermined amount of water into the brine tank containing salt pellets, required optimum conditions for proper operation, such conditions being virtually incapable of attainment in practice. Because of the relative complexity and therefore high cost of previous automatic systems, they were not only beyond the financial ability of the average home owner, but also subject to frequent malfunctions in use. It is with the overcoming of the foregoing shortcomings of prior art automatic water softening equipment that the pesent invention is concerned.

Accordingly, a primary object of the present invention is to provide an improved water softening system including a plurality of uniquely integrated components capable of providing long trouble free operation on an economical basis, thereby rendering it manifestly suitable for home use.

Another object of the present invention is to provide an improved regeneration valve for water softening apparatus which has relatively few simple moving parts coacting in such a manner as to simply and efficiently move between water softening and regenerating positions and therefore not only provide long trouble-free service but also be capable of manufacture at a relatively low initial cost.

A further object of the present invention is to provide an improved brine valve for a water softening apparatus which will provide positive trouble-free operation under all operational conditions including those conditions wherein the equipment in which it exists is not installed in an optimum manner.

A still further object of the present invention is to provide improved water softening apparatus for home use which includes parts which can be assembled with each other in an extremely simple manner, and when so assembled permit access to the various parts of the apparatus for repair or replacement. A related object of the present invention is to provide a pair of uniquely integrated tanks for zeolite and brine to each of which access may be had without requiring access to the other notwithstanding that one is mounted within the other. A further related object of the present invention is to provide an improved water softening apparatus wherein the regenerating valve and the brine valve may each be removed as a unit in a simple manner for repair or replacement, if required.

Another object of the present invention is to provide an improved water softening apparatus including an improved brine valve assembly which permits the level of water in said brine tank to be adjusted in a simple manner from outside of the tank to thereby provide required amounts of brine for various regeneration requirements. A related object is to provide an improved brine valve arrangement which insures proper flow of water into the brine tank even under conditions wherein fused salt tends to impede the flow of water through the brine tank.

Still another object of the present invention is to provide improved water softening apparatus having a safety shut-off incorporated therein which terminates flow of water to the brine tank in the event that the brine valve does not close in its normal intended manner. Other objects and attendant advantages of the present invention will readily be perceived hereafter.

The improved automatic water softening apparatus of the present invention essentially includes a zeolite tank, a brine tank, a regeneration valve, a brine valve, and related liquid circuitry, all associated with each other in a unique manner. During normal water softening action, the regeneration valve causes flow of hard water through the zeolite tank, where it is softened, and into the piping of the house. A small measured amount of water also is caused to pass into a brine tank containing salt pellets, and when a predetermined level of water is obtained in the brine tank, the brine valve associated therewith causes the flow of water into the brine tank to cease. During the water softening action of the apparatus, the salt pellets soak in the water to produce concentrated brine. It will be appreciated that the zeolite will become exhausted after a predetermined amount of water has passed through it, and it must therefore be regenerated beforce this occurs so that it will function satisfactorily as a water softener. Therefore after the zeolite has been used in the above manner for a predetermined period of time, a timing mechanism causes the regeneration valve to shift to a new position wherein it causes the above-mentioned brine supply to be passed through the zeolite to regenerate it and thereafter, with the same valve setting, causes clear water to flush the brine from the zeolite. The regeneration valve, in its regeneration position also permits water to pass from the source of the house supply lines, in the event water is needed in the house, thereby insuring a continuity of water supply even though regeneration is being simultaneously effected.

The above-noted regeneration valve is characterized by its extreme simplicity which not only causes it to provide long, trouble-free, automatic operation, but also permits it to be manufactured at low cost. More specifically, aside from a solenoid operated pilot valve which is actuated by a timer, the regeneration valve has only two moving parts which achieve all of the above-enumerated functions. These two moving parts are a piston and a slide valve coupled thereto. Normally the solenoid pilot valve is deenergized and the hydraulic pressure of the water supply causes the piston to be moved to a first position wherein it causes the slide valve to route the hard water in the above described manner for softening. The foregoing position is maintained for 23½ hours of the day, and the regenerating position is maintained for ½ hour of the day, preferably about three o'clock in the morning when there are usually no demands made on the water system. Upon energization, the solenoid pilot valve causes the hydraulic pressure of the water supply to shift the piston, and with it, the slide valve coupled thereto to a second position to route the water and supply brine in the above described manner for regeneration. The slide valve and the piston move approximately a quarter of an inch between water-softening and regenerating positions, this minimum amount of movement coupled with the relatively few moving parts enhancing the longevity of the valve. The slide valve is pressed against its seat by the same hydraulic pressure which moves the piston, this causing the hydraulic pressure to do the necessary work in maintaining a good seal of the slide valve on its seat and providing a balanced action wherein the hydraulic seating force and the slide valve moving force bear a definite relationship to each other regardless of the water pressure in the particular system because the same pressure is applied to both. Stated another way, the regeneration valve will operate satisfactorily as long as sufficient pressure is supplied thereto to move the piston. Therefore, the valve will operate at practically any water pressure and thus can be used in any locality without requiring special adjustment for the water pressure thereof. Furthermore, the hydraulic pressures on both sides of the slide valve are such as to cause it to be firmly seated regardless of the hydraulic pressure of the water supply. In short, the regeneration valve includes a plurality of uniquely integrated parts capable of providing long life and trouble-free operation at both a low initial cost and a practically non-existent maintenance cost.

The improved brine valve of the present invention includes a rectilinearly movable stem having a first poppet valve thereon which is float-actuated for shutting of flow into the brine tank when the water therein reaches a predetermined level. Also mounted loosely on the stem is a poppet valve which follows the level of the brine downwardly as it is exhausted and shuts off the flow of brine before air can be sucked into the system. The orientation of all of the elements is such and they have sufficient looseness so that they are essentially self-centering and therefore will function properly even through the brine tank is not mounted level. The brine valve and its associated float mechanism is housed within a cylindrical tube mounted within the brine tank, the tube preventing salt pellets and other foreign matter with interfering with the proper operation thereof.

In accordance with one embodiment of the present invention, the brine valve float level may be adjusted from outside of the tank in a simple manner to thereby provide a selectively variable amount of brine depending on the regeneration requirements of the particular installation. In addition, in one embodiment of the present invention a safety shut-off valve is associated with the brine valve to positively cause the flow of water into the brine tank to terminate in the event that the brine valve fails to shut flow off when the water reaches a predetermined level, thereby assuring that there can be no leakage or overflowing of the brine tank.

All of the elements forming a part of the improved water softening apparatus of the present invention are uniquely integrated so as to enhance their ease of manufacture. More specifically, a zeolite tank is located within a brine tank, both being preferably cylindrical. The lower end of the zeolite tank fits within an aperture on a base on which salt pellets are located within the brine tank, the salt pellets occupying a position between the zeolite tank and the walls of the brine tank. A loose fitting cover it fitted over the brine tank, said cover having a hole therein through which the top of the zeolite tank fits. The hole in the base and in the cover thus positively locates the zeolite tank without the need for external brackets or supports. The improved regenerating valve of the present invention fits on top of the zeolite tank to permit ready access thereto. Furthermore, notwithstanding that the zeolite tank is located within the brine tank, access may be had to the inside of each tank without opening the other. Also included within the brine tank is a tubular column which houses the brine float valve and associated mechanism and protects them from foreign bodies such as the salt pellets. The uniqueness of the foregoing combination which leads to its low fabrication cost will be all the more appreciated hereafter.

The present invention will be more fully understood when the following portions of the specification are read in conjunction with the accompanying drawings wherein:

FIGURE 15 is a view taken substantially along line

15—15 of FIGURE 12 with certain parts omitted in the interest of clarity;

Figure 1:
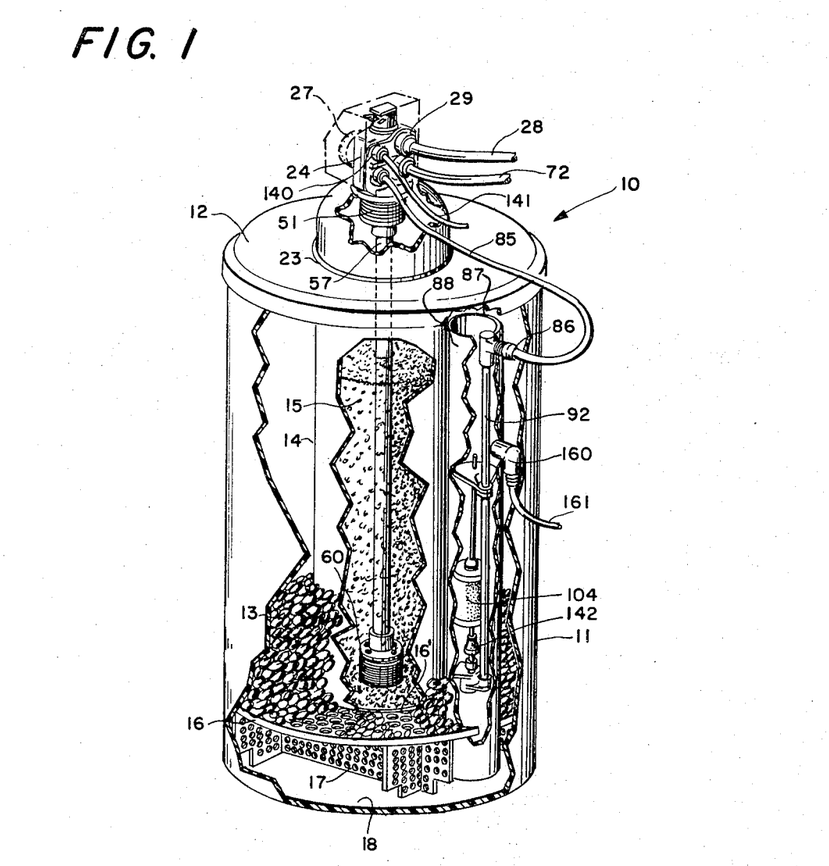
FIGURE 1 is a fragmentary perspective view of the improved water softening apparatus of the present invention.

In FIGURE 1 the improved water softening apparatus 10 of the present invention is shown which includes a substantially cylindrical outer brine tank 11 having a removable cover 12 thereon which can be moved upwardly off of the edge of tank 11 to permit slow dissolving salt pellets 13 to be dumped within tank 11 so that they occupy a position between the inner surface of tank 11 and the outer surface of substantially cylindrical zeolite tank 14 located within tank 11. Tanks 11 and 14, and cover 12 are preferably made of molded plastic containing glass fibers.

Zeolite tank 14 contains a supply of conventional zeolite material 15 to a predetermined depth therein, as determined by the amount of water which is to be softened per unit of time between regeneration periods. The lower end of zeolite tank 14 rests in perforated hardboard base 16 which is supported on perforated hardboard grid 17 resting on the bottom surface 18 of tank 11. Grid 17 consists of perforated hardboard slats 19 and 20 which are assembled in the manner shown in FIGURE 20 and have cut-away corners 21 and 22, respectively, to permit unimpeded flow of brine solution therethrough in addition to the flow through the perforations within the grid itself. Perforated base 16 is circular and fits within tank 11 and supports the salt pellets 13 thereon so that they do not drop into the space below base 16, said latter space being reserved for brine solution which is formed in the manner to be discussed in detail hereafter.

Base 16 has a centrally located circular hole 16' therein to permit the bottom portion of zeolite tank 14 to rest on bottom 18 of tank 11. In this respect the locating of tank 14 at its lower end by placing it in an aperture in base 16 and the locating of the upper end of tank 14 by causing it to protrude through aperture 23 in cover 12 insures a stable mounting of tank 14 within tank 11 which can be effected in a simple manner. However, in certain applications tank 14 may rest on top of base 16. The foregoing orientation of brine tank 11 and zeolite tank 14 provides an extremely convenient and space saving arrangement for the various components. As will become more apparent hereafter, access may be had to either of tanks 11 or 14 without requiring access to the inside of the other.

A regenerating valve 24 includes a casing 25 which is preferably cast of corrosion-resistant bronze with a threaded neck 26 at the lower end thereof which is received in a suitable mating tapped aperture, not shown, at the top of zeolite tank 14 (FIGURE 1). The threaded neck permits valve 24 to be removed from tank 14 and thus functions as a removable cover for a small access hole in tank 14. During the water softening action of the instant apparatus 10, the various components of the regenerating valve 24 occupy the positions shown in FIGURES 6 and 7 to provide the consumer with water which has been softened by passing through the zeolite 15 in tank 14. It will be appreciated that for normal household use it is most convenient to regenerate once every twenty-four hours thus permitting a smaller amount of zeolite 15 to be used than if regeneration should be effected every few days.

Figure 6:
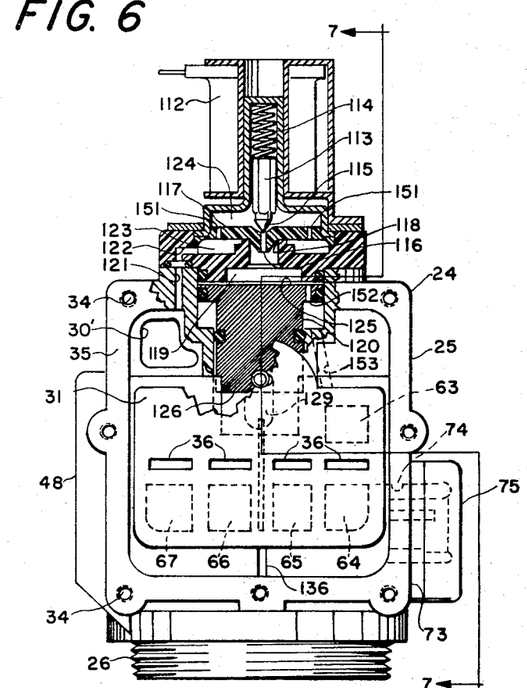
FIGURE 6 is a cross sectional view through the regeneration valve showing various components thereof including the slide valve and the solenoid actuated valve in the positions which they occupy during normal water softening, said view being taken substantially along line 6—6 of FIGURE 7 with certain parts broken away and certain parts omitted in the interest of clarity.
Figure 7:
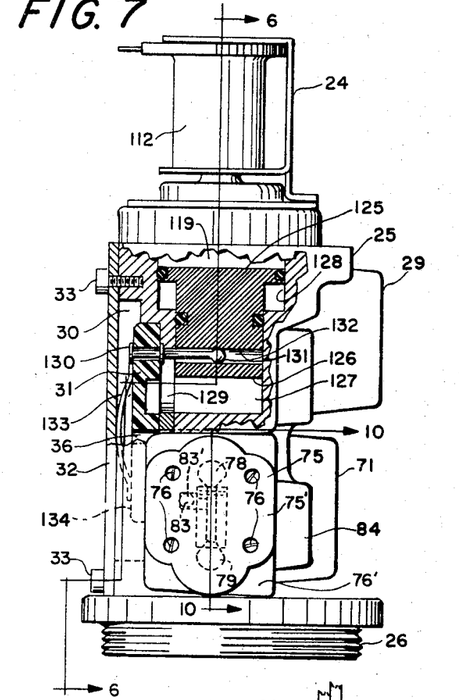
FIGURE 7 is a view of the regeneration valve taken substantially along line 7—7 of FIGURE 6.

Regeneration can be achieved well within a half hour period and therefore the various parts of the regeneration valve shown in FIGURES 6 and 7 occupy their normal water softening position for approximately 23½ hours per day and the valve is shifted for providing regeneration during one half hour of the day which is preferably between 3:00 and 4:00 a.m., when there are usually no demands on the water system. The foregoing shifting between water softening and regenerating positions is automatically achieved in response to the action of electric timer 27 as will become more apparent hereafter. It will also be noted at this juncture that in the event there are demands on the water system the regenerating valve 24 will permit hard water to be supplied directly to the taps in the house during the regeneration process.

Figure 3:
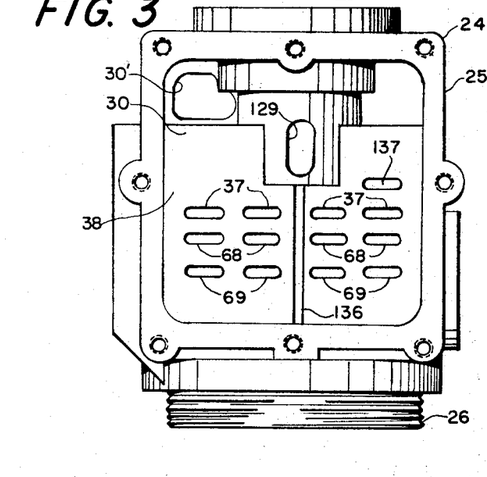
FIGURE 3 is a view taken substantially along line 3—3 of FIGURE 2.
Figure 4:
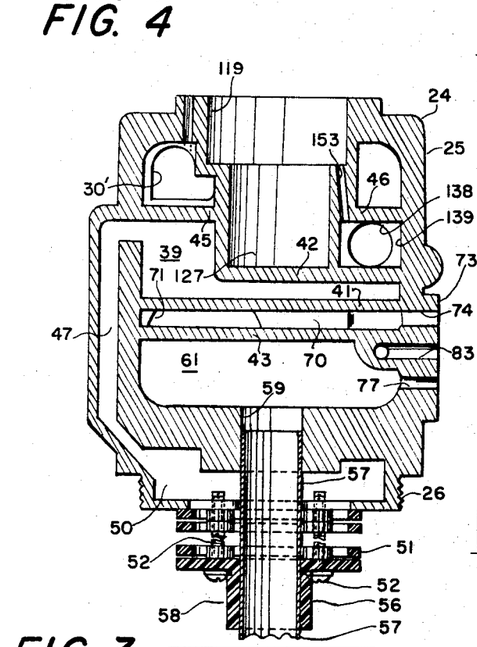
FIGURE 4 is a view taken along line 4—4 of FIGURE 2.

In order to provide water to the instant water softening equipment 10, a conduit 28 (FIGURE 1) which leads from the hard water supply is threaded into inlet nipple 29 of regenerating valve 24 which is in communication with chamber 30 (FIGURES 3 and 7) through opening 30' (FIGURES 3 and 4). Chamber 30 forms a portion of valve housing 25 behind slide valve 31 (FIGURE 7) and within back plate 32 mounted on housing 25 by screws 33 which are received in tapped apertures 34 in housing 25, a suitable gasket, not shown, being provided between back plate 32 and the seat 35 on housing 25 to prevent leakage. The water flowing to chamber 30 from conduit 28 passes through spaced apertures 36 (FIGURES 6 and 8) in slide valve 31. In the water softening position, slide valve 31 has apertures 36 thereof in alignment with apertures 37 (FIGURE 3) in brass plate 38, said apertures 37 extending entirely through plate 38 to permit communication between the above mentioned chamber 30 and chamber 39 (FIGURE 4) when said apertures 36 and 37 are in alignment.

Figure 2:
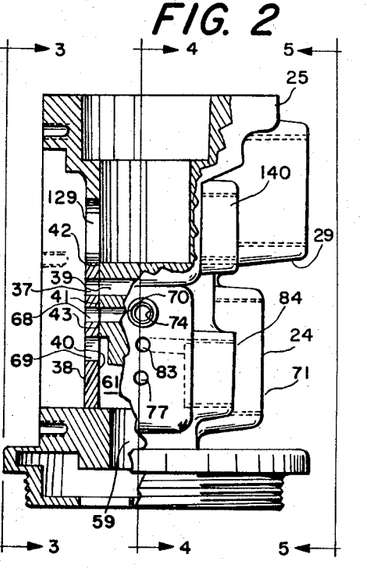
FIGURE 2 is a partial cross sectional end elevational view of the improved regeneration valve of the present invention, with certain parts of the valve omitted in the interest of clarity.

As can be seen from FIGURES 2 and 4, plate 38 is mounted so that the rear surface 40 thereof is in fluid tight relationship with partitions 41, 42, 43, 45 and 46. Apertures 37, as noted above, are in communication with chamber 39. Thus, when apertures 36 in plate 31 are in alignment with apertures 37 the above noted water in inlet conduit 28 may communicate with the inside of zeolite tank 14 through nipple 29, opening 30', chamber 30, apertures 36 in slide valve 31, apertures 37 in plate 38, chamber 39 (FIGURE 4), conduit 47 which is cast within housing 25 (FIGURE 4) and is a portion of housing extension 48 (FIGURE 6), and conduit 50 which has filter or strainer 51 (FIGURES 3 and 4) secured thereto by screws 52 threaded into the bottom of housing 25. Thus hard water enters zeolite tank 14.

Figure 15:
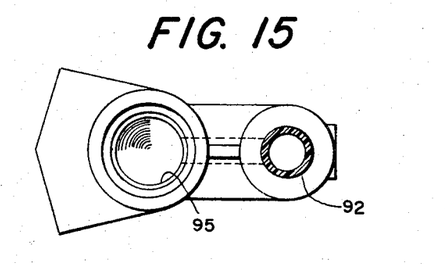
Figures 15A, 20, 21:
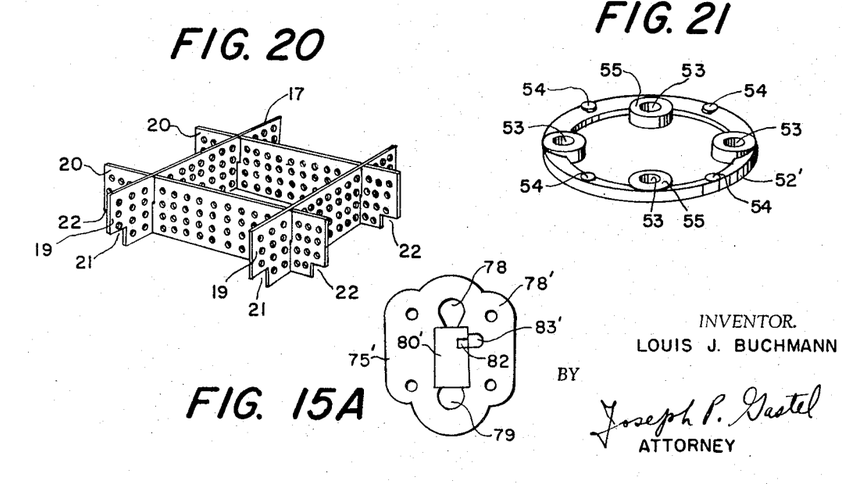
FIGURE 15A is a view of the face of the jet pump or venturi which abuts the side of the regeneration valve housing.
FIGURE 20 is a perspective view of the grid which is located in the brine tank.
FIGURE 21 is a perspective view of one of the rings which is used to form the strainer in the zeolite tank.

Filter 51 (FIGURE 1) consists of a plurality of stacked discs 42' such as shown in FIGURE 21, said discs having apertures 53 to receive screws 52 and having spacer knobs 54 and 55 moulded integrally therewith so as to cause the spacing between adjacent plastic discs to be such that large particles cannot pass through filter 51. A plastic coupling 56 (FIGURE 3) forms the lowermost portion of strainer 51 and a plastic tube 57, which fits tightly in nipple 58 of said plastic coupling 56, is in fluid tight sealing relationship with circular aperture 59 in housing 25. Thus the hard water flowing from regenerating valve 24 flows outside of plastic conduit 57, through filter 51, and into the top of zeolite tank 14 through filter 51.

The hard water then passes downwardly through the zeolite material 15 within tank 14 and during such passage the water is softened. The softened water passes through a filter or strainer 60 which is located at the lower end of conduit 57 centrally located within tank 14. Filter 60 may be of the same construction as strainer 51 except that it is inverted. Strainer 60 prevents the zeolite particles from entering conduit 57 along with the softened water which flows upwardly therein and into aperture 59 (FIGURE 4) in communication with chamber 61 (FIGURE 4) of regenerating valve 24.

Figure 8:
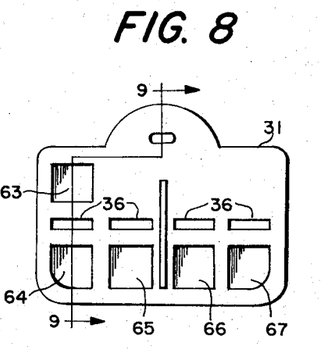
FIGURE 8 is an elevational view showing the face of the slide valve portion of the regeneration valve.

At this point it is to be noted from FIGURE 8 that the face of slide valve 31 which is in engagement with plate 38 has a plurality of grooves 63, 64, 65, 66 and 67 therein. In the position of slide valve 31 shown in FIGURE 6, that is the water softening position, grooves 64, 65, 66 and 67 each bridge a pair of slots 68 and 69 in plate 38 (FIGURE 3). Thus the softened water in chamber 61 (FIGURE 4) passes through slots 69 in plate 38, grooves 64, 65, 66 and 67, and slots 68 into chamber 70 (FIGURE 4) which is in communication with nipple 71 (FIGURE 5) extending from the rear of housing 25 and mounting conduit 72 (FIGURE 1) leading to the piping of the house. By passing through the above described path in water softener 10 the hard water entering through conduit 28 leaves as soft water through conduit 72 for use in the house.

Figure 5:
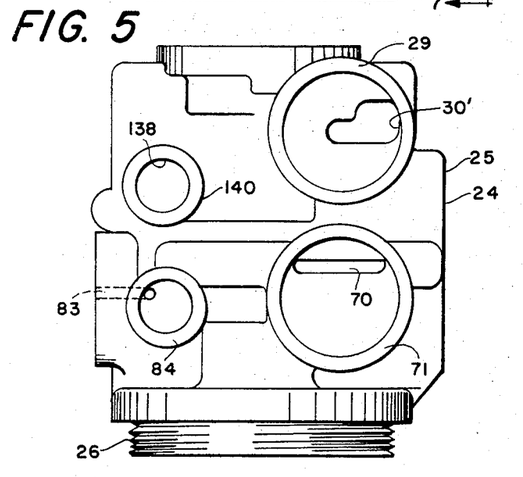
FIGURE 5 is a view taken substantially along line 5—5 of FIGURE 2.
Figure 10:
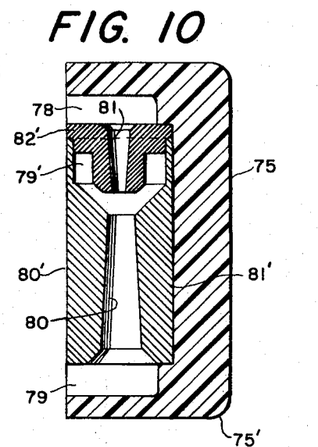
FIGURE 10 is a cross sectional view of the jet pump associated with the regeneration valve, said view being taken along line 10—10 of FIGURE 7.

At this point it is to be noted that chamber 70 (FIGURES 2 and 4) leads to seat 73 of housing 25 through conduit 74. A venturi construction 75 (FIGURE 10), which essentially consists of a block 75' having a venturi installed therein is secured to seat 73 by screws 76 (FIG. 7) with a suitable gasket interposed between the block 75' and seat 73 to prevent leakage. It is also to be noted that a conduit 77 (FIGS. 2 and 4) is in communication with chamber 61 which, as noted above, is in communication with chamber 70 through grooves 64, 65, 66 and 67 in slide valve 31. The venturi 75 (FIG. 10) includes a first conduit 78 in communication with conduit 74 and a second conduit 79 in communication with conduit 77. Conduits 78 and 79 are subjected to high pressure softened water which flows into said conduits and then into venturi conduit 80 from conduit 79 and venturi conduit 81 from conduit 78. Thereafter the softened water passes out of venturi conduit 82, which is in communication with conduit 83 (FIGS. 2 and 4) in regenerating valve housing 25, conduit 83 in turn extending through the housing (FIG. 2) and being in communication with nipple 84 (FIG. 5) on housing 25. Thus the softened water will be conducted to nipple 84.

Venturi 75 (FIGURES 7, 10 and 15A) includes a rectangular metallic block 80' pressed into the face 78' which is mounted on seat 76' (FIGURE 7). Inserted into a hole 79' at the end of block 80' is a jet 82'. Block 80' and jet 82' may be made by screw machine operation, both of said parts being made of corrosion resistant metal. As can be seen from FIGURE 15A, a slot 82 is cut across block 80' so that the throat of the venturi may communicate with groove 83' in block 75', groove 83' in turn being located at the outer end of conduit 83 (FIGURE 7).

Figure 12:
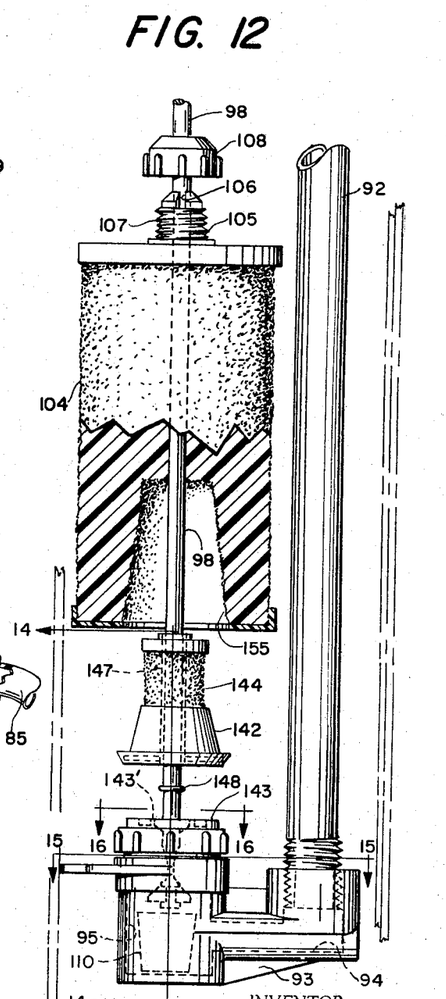
FIGURE 12 is a fragmentary perspective view of the brine valve construction.
Figure 13:
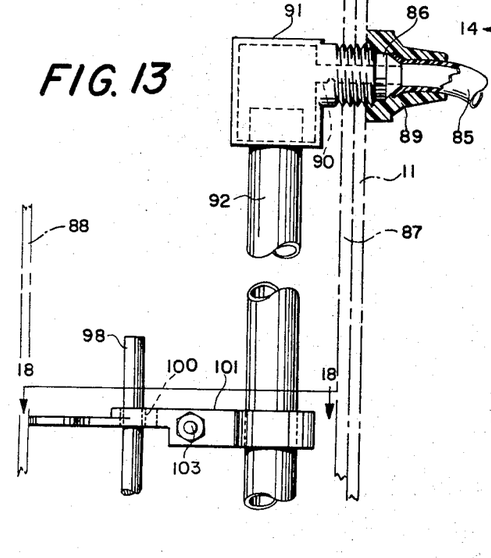
FIGURE 13 is a fragmentary perspective detail view showing the manner in which a portion of the brine valve construction is attached to the brine tank.
Figure 14:
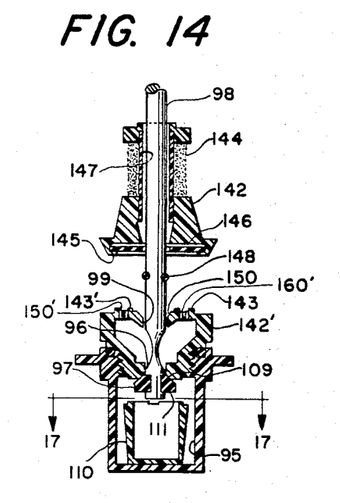
FIGURE 14 is a cross sectional view of a portion of the float valve taken along line 14—14 of FIGURE 12.
Figure 18:
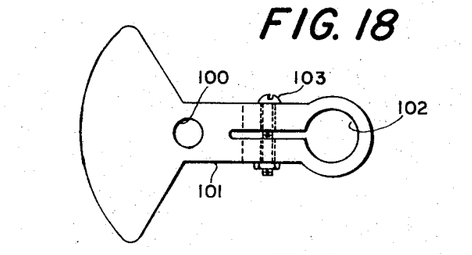
FIGURE 18 is a plan view of the bracket for guiding the upper end of the float rod.

A conduit 85 (FIG. 1) is mounted on nipple 84 and extends between said nipple and nipple 86 (FIGS. 1 and 13) forming a part of the brine system. Nipple 86 extends through suitable apertures in the wall 87 of cylindrical tube 88 and the wall of tank 11 (FIG. 13). A fastening nipple 89 (FIG. 13) fastens conduit 85 to nipple 86 in the manner shown in FIG. 13. Tube 88 prevents the salt pellets 13 from interfering with the operation of the float mechanism and brine valve structure housed within it. The water from conduit 85 passes through conduit 90 of nipple 86 and through cap 91 which is mounted in fluid tight relationship with conduit 92 (FIGS. 1, 12 and 13) located within tube 88. The water passing through tube 92 passes into valve housing 93 (FIG. 12) screwed on the bottom of tube 92 and through conduit 94 into valve chamber 95 of valve housing 93 (FIGS. 12 and 14). The water entering chamber 95 will pass through valve opening 96 (FIG. 14) when spherical valve 97 is unseated from frusto-conical seat 109, spherical valve 97 being mounted in the manner shown on rod 98 which is loosely mounted within aperture 99 at the lower end thereof and is loosely mounted within aperture 100 (FIGS. 13 and 18) at the upper end thereof, aperture 100 being within guide 101 (FIGS. 13 and 18) having a circular portion 102 which is adapted to encircle conduit 92 and be tightened thereon by nut and bolt 103 in any desired adjusted position.

A float 104 (FIG. 12) which may be made of polystyrene plastic or any other suitable material, has the upper end thereof formed into a threaded member 105 having split 106 therein, member 105 having a threaded portion 107 for receiving cap 108. Rod 98 extends through float 104 and the tightening of cap 108 on portion 105 in any adjusted position of float 104 on rod 98 will cause it to remain in said adjusted position.

It will thus be seen that whenever soft water passes between spherical valve 97 and its frusto-conical seat 109 (FIG. 14), water may flow into cylindrical tube 88 However, the bottom of said tube is approximately 1" above the bottom 18 of brine tank 11 and thus the water will flow into the bottom of the tank and rise upwardly therein through grid 16 and into the salt pellets 13. The water thus coming in contact with the salt pellets will become saturated with salt. Also as the water rises in tank 11 it will rise in tube 88 until such time, insofar as pertinent here, as float 104 rises and brings valve 97, which includes a portion of spherical curvature on its lower surface, into engagement with conical seat 109 to thereby terminate the flow at a predetermined level within tank 11. Thus there can be no more flow of soft water through conduit 92 into tank 11 when valve 97 is seated.

It is to be noted at this point that in view of the fact that there is looseness between rod 98 and apertures 99 (FIG. 14) and 100 (FIGS. 13 and 18), rod 98 has a latitude of horizontal movement in addition to its vertical movement with float 104 to which it is attached. Furthermore, there will tend to be line contact between the surface of spherical valve 97 and frusto-conical valve seat 109. The foregoing factors when taken in combination cause the valve action to be self-aligning and self-adjusting to thereby insure a good seal even though brine tank 11 may not be mounted perfectly level.

Figure 17:
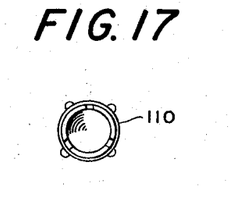
FIGURE 17 is a plan view of the cup insert at the end of the liquid conduit, said view being taken along line 17—17 of FIGURE 14 with certain parts omitted in the interest of clarity.

It is also to be noted at this point that a cup 110 made of plastic is located within chamber 95 (FIG. 14). The cup is located so that the inlet conduit 94 (FIG. 12) causes water to impinge on the side thereof and the water thus impinging flows upwardly around the outside surfaces of cup 110 and thence through aperture 96 when valve 97 is unseated. There is no direct impingement of water on the bottom 111 of valve 97 because this portion of the valve is shielded by cup 110. Therefore valve 97 cannot be seated on seat 109 as a result of the force due to water flow but can be seated only on valve seat 109 in response to the upward movement of float 104 when the water level in tank 11 has reached a predetermined value. The flow through chamber 95 causes cup 110 to rise upwardly so that its upper surface engages the portion of the chamber surrounding valve seat 109, valve 97 at this time fitting within cup 110. Optimum metered liquid flow will then be through the three slots, not numbered, at the top of the cup (FIGS. 14 and 17).

Once the predetermined level is reached in brine tank 11, this level is maintained therein to provide a source of brine for regenerating zeolite 15 in a manner to be described in detail hereafter. The foregoing flow of water into brine tank 11 occurs immediately after regenerating valve 24 has shifted to the above described position shown in the above described drawings. The salt pellets 13 will soak in the water for a period of approximately 23.5 hours while the water softener 10 is on the water softening cycle, the 23.5 hour period being measured by timer 27. As noted above, the regenerating cycle is initiated at approximately 3:00 a.m. when there usually is no demand on the household water supply, this regeneration being for the purpose of passing brine through zeolite 15 and occurring automatically in response to the action of timer 27.

In order to initiate regeneration, timer 27 causes solenoid 112 (FIGS. 6 and 7) to be energized thereby causing armature 113 thereof to move upwardly against the bias of spring 114 and thereby moving point 115 away from aperture 116 in rubber diaphragm 117. The movement of armature 115 in the above manner will cause diaphragm 117 to move away from seat 118 and therefore permit communication between chamber 30 having high pressure hard water therein and chamber 119 (FIG. 6) located above piston 120 through conduits 121, 122, and chamber 123. The reason that diaphragm 117 moves away from sealing relationship with circular seat 118 is that as soon as aperture 116 in diaphragm 117 is opened, the pressure within chamber 123 will move diaphragm 117 upwardly away from said seat 118 because the water in chamber 124 above diaphragm 117 can pass therefrom through aperture 116.

It is to be noted at this point that piston 120 has an upper surface 125 which has a greater area than its lower surface 126 which is located in cylinder 127 (FIG. 7), the upper piston 125 being located in cylinder 128. It is to be further noted that lower chamber 127 is in communication with high pressure hard water chamber 30 through slot 129 (FIGS. 3 and 7). Thus upper chamber 119 and lower chamber 127 are both at the same high pressure immediatley after diaphragm 117 is unseated. However, in view of the fact that upper piston surface 125 is greater than lower piston surface 126, piston 120 will move downwardly from the position shown in FIGS. 6 and 7 and in so doing will carry slide valve 31 (FIG. 7) downwardly from the position shown in FIG. 7 because of the connection therebetween, namely, pin 130 (FIG. 7) having a spherical end 131 located in cylindrical bore 132 of piston 120 and the other end staked across opposite sides (not numbered) of slide valve 31 (FIG. 7).

Figure 9:
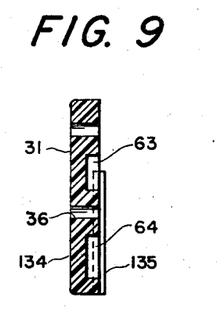
FIGURE 9 is a cross sectional view taken along line 9—9 of FIGURE 8.
Figure 11:
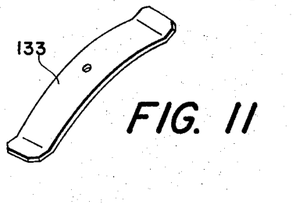
FIGURE 11 is a perspective view of the leaf spring associated with the slide valve portion of the regeneration valve.

The spherical configuration 131 of pin 130 in combination with the cylindrical bore 132 permits a certain amount of canting between pin 130 and piston 120 without forcing the unseating of slide valve 31 which is biased against plate 38 by leaf spring 133 (FIGS. 7 and 11) interposed between the inside surface (not numbered) of back plate 32 and the rear surface 134 (FIG. 9) of slide valve 31. It is to be noted at this point that the leaf spring 133 is merely located in the above-described position as a safety factor to prevent unseating of slide valve 31 in transit, since said valve is maintained on its seat (not numbered) on plate 38 by the force of hydraulic pressure exerted on the rear surface 134 thereof when the water softener is in operation. It is to be also noted at this point that in moving from its higher position to its lower position, slide valve 31 travels with a perfectly rectilinear motion in view of the fact that key 135 (FIG. 9) is inserted in the face of valve 31 and is received in keyway 136 (FIG. 3) in plate 38. Plate 38 is coated with a thin layer of material known under the trademark Teflon to provide lubrication and thus facilitate the sliding movement of slide valve 31 on plate 38, and in addition to resist the deposit of mineral coatings and the like on the contacting surfaces.

It is to be noted at this juncture that the slots 36 and all the grooves in slide valve 31 and all the slots 37, 68, and 69 in plate 38 have sharp edges and therefore provide a self-cleaning action between plate 38 and slide valve 31 incidental to relative movement therebetween. In addition, the movement causes the contacting surfaces to lap themselves into improved sealing relationship with use.

After slide valve 31 moves from the position shown in FIG. 6 to a lower position (not shown) under the action of piston 120 because of the above described connection therebetween, a point will be reached where slide valve 31 comes to rest so that slots 36 therein are in alignment with slots 68 (FIG. 3) of plate 38 after having moved out of alignment with slots 37.

Furthermore, grooves 64, 65, 66, and 67 in slide valve 31 will no longer bridge slots 68 and 69 in plate 38 but will merely be in communication with slots 69. However, groove 63 (FIG. 8) in slide valve 31 will now bridge one of slots 37 and slot 137 in plate 38 directly above it (FIG. 3). The movement of slide valve 31 to the above described position requires only approximately one-quarter inch of travel, thereby producing the change of position from water softening to regenerating with an extremely small amount of movement.

The following liquid circuits are established as a result of the above described movement within valve 24: First of all, even during regeneration a supply of water to the house will be assured because there can be communication between conduit 28 leading from the supply source and conduit 72 (FIG. 1) leading to the house lines through aperture 30', chamber 30, now aligned slots 36 of slide valve 31 and slots 68 of plate 38, chamber 70, and nipple 71 in communication therewith.

Furthermore, the brine solution which was stored within brine tank 11 is now supplied to zeolite material 15 within tank 14 for regeneration purposes. More specifically, the high pressure water now in chamber 70 (FIG. 4) passes through conduit 74 and into conduit 81 (FIG. 10) of the venturi 81' and thereafter past the throat of the venturi into conduit 80 thereof from which it passes into conduit 77 (FIG. 4) leading to chamber 61 of the valve. However the passage of water from conduit 81 to conduit 80 of the venturi creates a low pressure area at the throat which is in communication with the portion 82 thereof, said portion 82 being in communication with brine valve chamber 95 (FIGS. 12 and 19) through conduit 94 (FIG. 12), conduit 92, nipple 86 (FIG. 13), conduit 85 (FIG. 1), nipple 84 at the rear of valve housing 25, and conduit 83 (FIG. 4) within housing 25. The subjecting of valve chamber 95 to a reduced pressure because of the flow through venturi 81' provides a suction which unseats spherical poppet valve 97 from its frusto-conical seat 109 and thus permits brine within brine tank 11 to be drawn into conduit 92. Thus the hard water passing through conduits 81 and 80 of venturi 81' has brine from tank 11 mixed therewith and this dilute brine solution passing into chamber 61 of regenerating valve 84 thereafter passes through valve conduit 59 (FIG. 4), conduit 57 in communication therewith (FIGS. 4 and 1) and out through filter 60 at the bottom of zeolite tank 14. Thereafter the dilute brine solution passes upwardly through the zeolite material 15 in zeolite tank 14, through strainer-filter 51, and into chamber 50 of housing 25 (FIG. 4). Thereafter the brine solution which has previously passed through the zeolite 15 passes into housing conduit 47 and chamber 39, which is now in communication with drain aperture 138 (FIG. 4) because groove 63 in valve 31 now bridges chambers 39 and 139 thereby permitting the brine solution to pass into nipple 140 on the rear of housing 25 (FIG. 5) which has conduit 141 attached thereto for conducting the brine solution to a drain, such as the sewer.

The foregoing passage of dilute brine solution through zeolite 15 continues until such solution is exhausted and this is determined when poppet valve 142 (FIGS. 1, 12, and 14) seats itself on valve seat 143. More specifically, poppet valve 142 has a polystyrene body portion 144 which causes it to follow the level of the liquid in brine tank tube 88. The lower portion of poppet valve 142 has a circular groove 145 (FIG. 14) therein which loosely mounts rubber washer 146. Furthermore a central aperture 147 extends throughout the length of poppet valve 142 for loosely receiving rod 98. As the level of brine falls in tube 88, washer 146 will always be below the liquid level and the float 142 will drop until such time as washer 146 becomes seated on ridges 143 and 143' to thereby terminate the exhausting of brine solution from tank 11. After such exhausting, the suction created by the above described passage of clear water through conduits 81 and 80 of venturi 81' will cause poppet valve 142 to seat firmly on its seats 143 and 143'. Thereafter only clear water will be permitted to pass upwardly through the zeolite 15 in the above described manner to thereby flush brine from the zeolite to thus prepare the zeolite 15 to again receive hard water for softening purposes without having present therein any trace of brine which can cause the household water to be salty.

Figure 16:
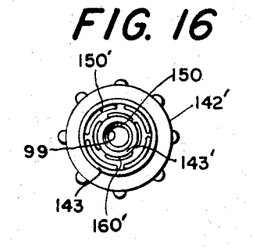
FIGURE 16 is a view taken along line 16—16 of FIGURE 12 and showing the valve seat at the end of the liquid conduit, certain parts of FIGURE 12 having been omitted in the interest of clarity.

It is to be noted that the oversized aperture 147 in poppet valve 142 in combination with the loose mounting of washer 146 insures firm seating of valve 142 on its seats 143' and 143 to thereby prevent the sucking of air into the liquid lines. More specifically, even though the tank 11 may not be mounted level, the oversized and loose dimensions described above will provide a self-centering and self-aligning type of action. In addition, it is to be noted that an O ring 148 is mounted in a groove in rod 98 ad this O ring moves into frusto-conical depression 150 in valve seat 142' to thereby prevent passage of brine therethrough after rod 98 has dropped a predetermined amount. Because of the existence of O ring 148, the above described loose fit may be provided between rod 98 and aperture 99 in valve seat 142'. It is to be noted at this time that the valve seat 142' is threaded into valve chamber 95 thereby facilitating the ease of manufacture. As can be seen from FIG. 16, valve seat 142' has a plurality of elongated arcuate apertures 150' and 160' therein for permitting liquids to pass through the valve seat when both poppet valves 142 and 111 are unseated.

The above described brine regeneration cycle which is followed by flushing of the zeolite 15 with clear water will continue for approximately one-half hour as determined by the operation of timer 27, and after the expiration of this time solenoid 112 will be deenergized to thereby cause armature 113 thereof to return to the position shown in FIG. 6 under the urging of spring 114 to thereby cause point 115 thereof to block aperture 116 in diaphragm 117. It will be understood that at this time diaphragm 117 is still unseated from its circular seat 118. However the blocking of aperture 116 will permit high pressure water existing in chamber 123 (FIG. 6) to move into chamber 124 through conduits (pin holes) 151 in diaphragm 117. The equalization of pressure on both sides of diaphragm 117 will cause it, under the urging of spring 114 and because of its natural resiliency, to return to its position on seat 118, as shown in FIG. 6. Therefore there will no longer be a supplying of high pressure water to chamber 119 above piston face 125. The water trapped in chamber 119 after the seating of diaphragm 117 may drain through conduit (pin hole) 152 extending through the upper portion of piston surface 125 and can drain into the portion of chamber 119 below piston surface 125 and then into conduit 153 (FIGS. 4 and 6) which is in communication with chamber 139 (FIG. 4) leading to the drain. The existence now of a low pressure area in chamber 119 above piston surface 125 and the existence of normal high pressure water on surface 126 of piston 120 because of the communication between chamber 127 and valve chamber 30 through slot 129 causes piston 120 to rise upwardly from its lowermost position to the position shown in FIG. 6 and causes slide valve 31 to return to its original above-described position wherein it again sets up the liquid circuits which cause hard water to be fed downwardly into zeolite tank 14, as described in detail above. This fluid circuitry will not be repeated at the present time because it would constitute a mere redundance.

However, the regenerating valve 24 now in combination with the brine valve causes a predetermined level of water to be supplied to brine tank 11. More specifically, as noted above, since chambers 70 and 61 (FIG. 4) of regenerating valve 24 are in communication with each other because of the position of grooves 64, 65, 66 and 67 bridging these chambers, high pressure soft water in said chambers will enter opposite ends of conduits 81 and 80 in venturi 81' and thereafter pass into groove 82 (FIG. 10) from which it passes into conduit 83 leading to conduit 85 in communication with conduit 92 within tube 88. The initial surge of water through conduit 92 will pop poppet valve 142 off of its seats 143' and 143 so that this water may enter brine tank 11. After poppet valve 142 has popped off in the foregoing manner, it floats upwardly, with the water level about rod 98 until such time as it is received in aperture 155 within float valve 104. Thereafter float valve 104 and poppet valve 142 move upwardly in unison until such time as spherical valve 97 comes into firm seating engagement with frusto-conical seat 109, whereupon further flow of water into brine tank 11 is terminated. The water in the brine tank 11 will become brine as a result of contact with the brine pellets 13.

The water softener 10 will maintain the above described liquid circuits until such time as timer 27 again indicates the need for a regenerating cycle whereupon the above described regenerating cycle will again be repeated.

It will be noted that piston 120 described above moves between its extreme positions as a result of water pressure and this same water pressure is exerted on the rear of slide valve 131. Thus the valve can work satisfactorily regardless of the value of the water pressure because the same water pressure which is applied to the valve to cause it to seat is applied to the piston to cause it to move and the dimensioning of said elements is such that the force produced by piston 120 is always in excess of the friction tending to prevent slide valve 31 from moving.

Figure 19:
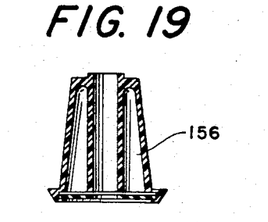
FIGURE 19 is a view of an alternate type of poppet valve associated with the brine valve for terminating the flow of brine from the brine tank.

In FIG. 19 an alternate embodiment of poppet valve 142 is shown. This embodiment instead of having a polystyrene body such as 144 in FIG. 14 has a hollow circular groove 156 therein to give it buoyancy. Otherwise it has the same construction of valve 142.

While it is highly unlikely that brine valve 97 will not seat squarely on frusto-conical seat 109 and therefore permit leakage after float 104 has reached its uppermost level there is provided an arrangement for giving a visual indication of this condition. More specifically, a nipple 160 extends through the wall of brine tank 11 so that in the event that the level of brine in said tank should exceed the height at which nipple 160 is placed, there will be slight leakage through conduit 161 onto the cellar floor to thereby alert the homeowner of the leaking condition. Alternately, conduit 161 may lead into a sump such as the basement drain sump. It will be appreciated of course, that the amount of leakage through conduit 161 will be extremely slight in view of the fact that valve 97 (FIG. 14) has practically seated and therefore there need be no concern that great amounts of water will be lost if, in fact, valve 97 does not seat properly.

Figures 22, 23, 24, 25:
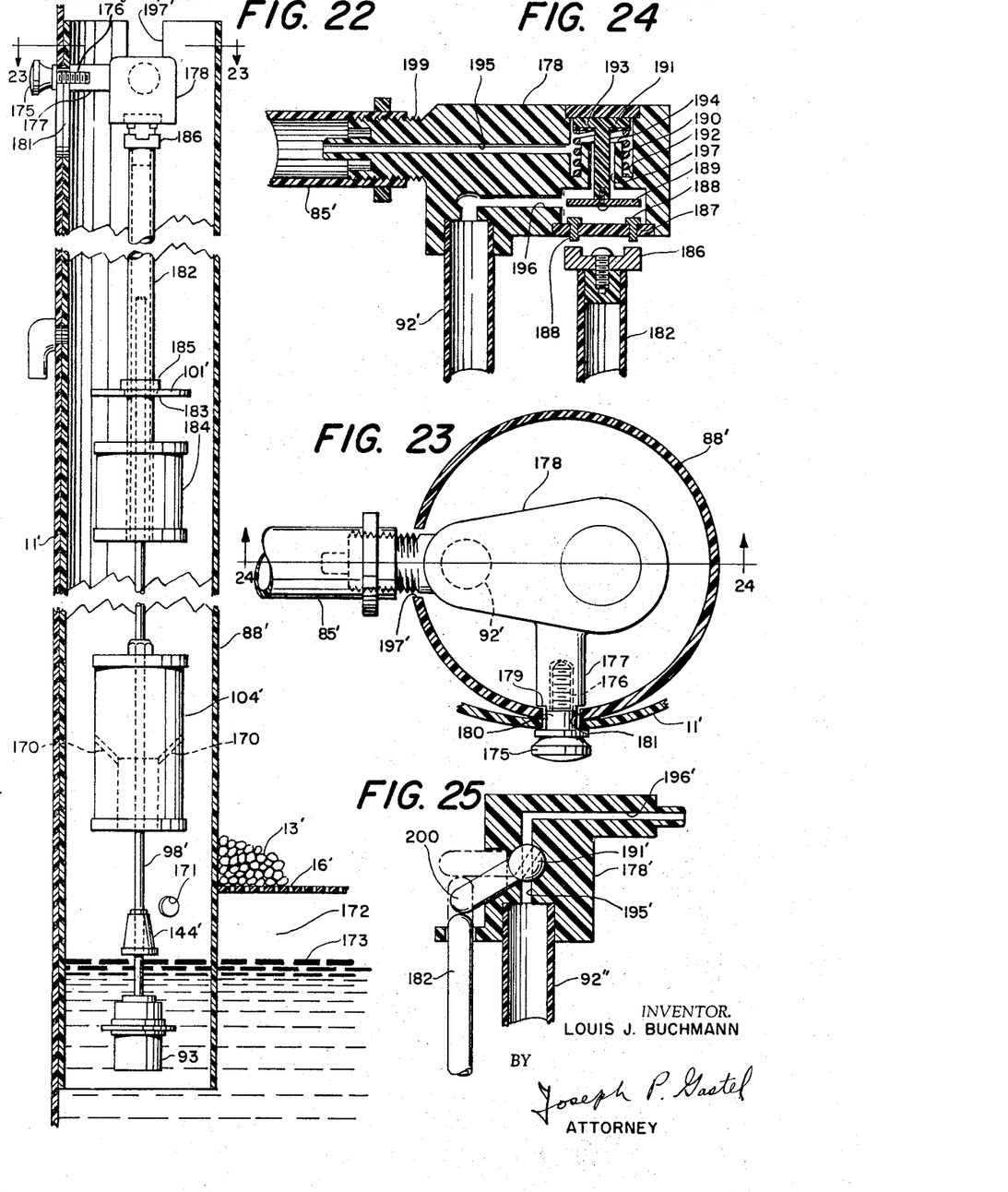
FIGURE 22 is a schematic view partially in cross section showing a modified embodiment of the present invention which includes a float valve arrangement for terminating the flow of water into the brine tank in the event that it should rise higher than the level at which flow is normally shut off.
FIGURE 23 is a view taken substantially along line 23—23 of FIGURE 22.
FIGURE 24 is a view taken substantially along line 24—24 of FIGURE 23.
FIGURE 25 is a schematic representation of an alternate type of valve shut-off arrangement.

In FIGURES 22–24 a modified embodiment of the present invention is shown which includes an auxiliary shut-off arrangement for terminating flow of water into the brine tank in the event that it should exceed the normal level a which such flow is shut off. More specifically, mounted within tank 11', which is analogous to tank 11 of FIGURE 1, is a cylindrical tube 88' which is analogous to tube 88 of the preceding figures. The float valve assembly is mounted within said tube and consists of generally the same structure described above with respect to the preceding figures except for the specific elements of structure which will be set forth hereafter. A shut-off float 104' is secured to rod 98' in the same manner as float 104 is secured to rod 98 in FIGURE 12. Furthermore, a float 144' is loosely mounted on rod 98' as is float 144 of FIGURE 12. The valve mechanism within conduit 93 is identical to that shown in FIGURE 12. However, a pair of air vents 170 are provided within float 104' to prevent the vacuum sealing of float 144' in float 104'. In other words, the existence of vent holes 170 permit float valve 144' to drop out of engagement from float 104' as the brine level lowers.

Furthermore, a vent aperture 171 is provided in cylindrical tube 88' to prevent a vacuum from being formed below base 16' on which salt pellets 13' are located. More specifically, after the salt pellets are wetted, they may dissolve and seal the apertures in base 16' so that air cannot reach the space 172 which lies underneath base 16' and above liquid level 173. When this is the case, a vacuum will be drawn in this space which will tend to impede the flow of brine into conduit 93. However, the existence of vent 171 in cylindrical tube 88' permits air to enter space 172 from tube 88' and therefore prevent the vacuum lock noted above.

It is to be noted at this point that conduit 92', FIGURES 23–24, is analogous to conduit 92 of FIGURES 1 and 12. However, in the interest of clarity, this conduit has not been shown in FIGURE 22.

It will be appreciated that the level of the brine in tank 11' should be adjusted so that an amount of brine is available for proper regeneration, preferably not too much and not too little. If too much brine is available there will be thorough regeneration but at the expense of wasting salt. If too little brine is available there will be incomplete regeneration. Accordingly, the present invention includes structure which permits the level of brine within tank 11' to be adjusted in an extremely simple manner from outside of the tank. More specifically, a knob 175 is provided having a threaded shank 176 which threads into arm 177 extending laterally from valve head 178. The end 179 of arm 177 abuts the inside surface of tube 88' and the inside of knob 175 engages the outside surface of tank 11'. The portion 180 of the adjusting screw fits within slot 181 of tube 88'. It will be appreciated that when the adjusting screw is tightened a portion of the wall of tube 88' and a portion of tank 11' are sandwiched between the head or knob of the adjusting screw and the end 179 of arm 177. However, when it is loosened, knob 175 may be moved up and down within slot 181 and with it the entire float assembly and conduit 92' which depend downwardly from valve head 178. In this manner the level of float 104' may be adjusted from outside of the tank after it has been initially located on rod 98'. Thus, if in a particular locality there is insufficient regeneration the entire float assembly may be raised and on the other hand if the salt consumption is too great it may be lowered.

In the embodiment of FIGURE 22 the upper end of rod 98' instead of fitting in an enlarged aperture 100 in bracket 101 as described above relative to FIGURE 18, fits within a tube 182 which in turn fits within an enlarged aperture 183 in bracket 101' which except for the enlarged aperture 183 may be identical to bracket 101 of FIGURE 18. Attached to the lower end of tube 182 is a float 184. A collar 185 is fixedly mounted on tube 182 above bracket 101' so that when the liquid level within tube 88' is below float 184, collar 185 will rest on bracket 101' and thus prevent tube 182 from dropping downwardly.

It will be appreciated that when float 104' is actuated by the rising liquid level the valve conduit 93 will normally shut off flow of liquid into tank 11' by actuating the valve in conduit 93. However, if for any reason the flow of liquid through conduit 93 should continue so that the liquid level will rise above float 104', its continued rise will eventually cause float 184 to be lifted and with it tube 182 extending upwardly therefrom. When this occurs, the upper portion of tube 182 having magnet 186 secured to the upper end thereof will approach plastic plug 187 which is located in valve head 178 and has pins 188 of magnetic material extending therethrough for concentrating the lines of force provided by magnet 186. As soon as magnet 186 gets very close to pins 188, disc 189, which is made of magnetic material such as soft iron will be pulled downwardly against the bias of spring 190 which is interposed between valve 191 and shoulder 192. The downward movement will cause the rubber face 193 of valve 191 to seat itself on seat 194 to thereby terminate the flow of liquid between conduit 195 and conduit 196 within valve head 178, said flow otherwise occurring through conduit 197 between said two conduits 195 and 196. It will be appreciated that said conduit 195 is in communication with flexible plastic tube 85' leading from nipple 84 of the regeneration valve. However, in the embodiment of FIGURES 22–24 the flexible plastic line does not extend outside of brine tank 11' such as in the manner shown in FIGURE 1, but extends downwardly through a hole in the cover of the brine tank and attaches onto threaded nipple 199 at the end of valve head 178 which is received within slot 197' at the upper end of tube 88'.

It will be appreciated that whenever valve 191 is caused to seat in the above described manner the termination of flow between conduits 195 and 196 will shut off flow into conduit 92' which is in communication with conduit 196 and thus the flow of water through the poppet valve assembly in conduit 93 will terminate even though float 104' is not operating properly, as would be the case in the event that foreign matter prevented proper closing of a valve such as 97–109 in FIGURE 14.

In the event the foregoing valve 191 is caused to close, the water softening system will still permit hard water to be supplied to the house with which it is associated and the home owner on being alerted by the lack of soft water can have the water softening apparatus serviced, which in this event, would merely require the disconnection of conduit 85' from valve head 178 and the withdrawing of the entire float valve assembly from tube 88' after knob 175 is removed from arm 177. An entirely new unit can then be inserted, if desired, or the old unit may be repaired, it being appreciated that after installation has been effected tube 182 must be pulled downwardly so that magnet 186 thereon is no longer in engagement with pins 188 made of magnetic material. Upon the disengagement between magnet 186 and pins 188 the magnetic force previously acting on soft steel disc 189 will no longer be present whereupon the expansion of spring 190 will cause valve 191 to be biased away from seat 194 to thereafter permit communication between conduits 195 and 196 through conduit 197.

In FIGURE 25 an alternate type of valve shut-off arrangement is shown which may be used in lieu of that shown in FIGURES 22–24. Broadly, the valve head 178' leading to conduit 92", which is analogous to conduit 92 of FIGURE 12, has a pet cock type of valve 191' associated therewith having an arm 200 which may be engaged by the top of tube 182 such as shown in FIGURE 22. In other words, when float 184 is actuated tube 182 will rise and engage arm 200 to thereby move it from its solid line position in FIGURE 25 to its dotted line position wherein it will terminate flow between conduits 195' and 196' in valve head 178'. It will be appreciated that valve 191' can be reset manually to reopen communication between conduits 195' and 196' after the defect which produced the overflowing is remedied. It will also be appreciated that while valve 191 of FIGURE 24 has been shown as being actuated magnetically and valve 191' of FIGURE 25 has been shown as having been actuated mechanically, a valve may also be actuated by the completion of an electric circuit which energizes a solenoid, if desired.

It can thus be seen that the water softening apparatus of the present invention is manifestly capable of achieving the above-enumerated objects, and while preferred embodiments of the present invention have been disclosed, it will readily be understood that it is not limited thereto, but may be otherwise embodied.

I claim:

1. A brine valve for water softening apparatus for terminating the flow of liquid into a tank when said liquid has reached a first predetermined level and for terminating the flow of liquid from said tank when said liquid has reached a second predetermined level lower than said first predetermined level comprising spaced guide means, a rod extending between said spaced guide means and loosely mounted therein for rectilinear movement, a float adjustably mountable in a fixed position on a central portion of said rod, a conduit for conducting fluid to and from said tank, a first poppet valve mounted on the lower end of said rod within said conduit, a first valve seat in said conduit for receiving said first poppet valve in sealing relationship when the liquid level in said tank rises to said first predetermined level and causes said float to rise and move said first poppet valve, a second valve seat mounted at the end of said conduit in coaxial opposed relationship to said first valve seat, a second poppet valve loosely mounted on said rod for movement toward and from said second valve seat, float means mounted on said rod and operatively coupled to said second poppet valve for causing said second poppet valve to follow the level of liquid in said tank and being of a sufficient weight to cause the valve portion thereof to be below the level of said liquid to thereby effect a sealing relationship with said second seat when said liquid has reached said second predetermined level which is above said second seat, said float means being of considerably shorter height than said float, and said loose connections between said rod and said guide means and between said rod and said second poppet valve providing a self-aligning action between both of said poppet valves and said seats to thereby effect a good sealing relationship even though said rod may not be mounted in a perfectly vertical manner.

2. A brine valve as set forth in claim 1 including adjustment means accessible from the outside of said water softening apparatus for varying the level of said flow within said tank.

3. A brine valve for water softening apparatus for terminating the flow of liquid into a tank when said liquid has reached a first predetermined level and for terminating the flow of liquid from said tank when said liquid has reached a second predetermined level lower than said first predetermined level comprising spaced guide means, a rod extending in a substantially vertical direction between said spaced guide means and loosely mounted therein for rectilinear movement, first float means mounted on a central portion of said rod, a conduit for conducting fluid to and from said tank, a first poppet valve mounted on the lower end of said rod within said conduit, a first valve seat within said conduit for receiving said poppet valve in sealing relationship when the liquid level in said tank rises to said first predetermined level and causes said float to rise and seat said first poppet valve on said first valve seat, a second poppet valve loosely mounted on said rod for movement toward and away from said second valve seat, second float means operatively coupled to said second poppet valve for causing said second poppet valve to follow the level of fluid in said tank and being of sufficient weight to cause the valve portion thereof to be below the level of said fluid to thereby effect a sealing relationship with said second seat when said liquid has reached said second predetermined level which is above said second seat, said loose connections between said rod and said guide means and between said rod and said poppet valve providing a self-aligning action between both of said poppet valves and said seats to thereby effect a good sealing relationship even though said rod may not be mounted in a perfectly vertical manner, third float means mounted on said rod and movable relative thereto, and valve means actuable by said third float means for shutting off the flow through said conduit in the event that the level of liquid in said tank should exceed said predetermined first level to thereby prevent said tank from overflowing in the event said first poppet valve does not seat firmly on said first valve seat.

4. A brine valve for a water softening system which is selectively adjustable from the outside of a brine tank in which it is located comprising a rigid conduit having a lower end and an upper portion above said lower end, valve means at said lower end of said rigid conduit for terminating the flow of liquid into and out of said tank, conduit means coupled to said upper portion of said rigid conduit for conducting liquid to said rigid conduit, float means operatively coupled to said valve means for controlling the opening and closing of said valve means, guide means operatively mounted on said rigid conduit and movably supporting said float means, and clamp means mounted on said upper portion of said rigid conduit for adjustably mounting said rigid conduit at various elevations in said brine tank to thereby adjust the level of brine in said tank by adjusting the position of said float means along with the position of said rigid conduit, said clamp means including a portion extending exteriorly of said brine tank to permit adjustment of said float level from outside of said tank.

5. A regenerating valve for water softening apparatus comprising a housing, first conduit means in said housing for conducting water to said housing from a hard water source, a first chamber in said housing in communication with said first conduit means, a planar valve seat in said first chamber, a slide valve on said planar valve seat, first aperture means in said slide valve, second aperture means in said valve seat, a second chamber in said housing in communication with said first chamber through said first and second aperture means when said slide valve is in a water softening position, second conduit means in communication with said second chamber for effecting communication between said second chamber and a zeolite bed, a third chamber in said housing for receiving water which passed through said zeolite bed, third conduit means in said housing for effecting communication between said zeolite bed and said third chamber, a fourth chamber in said housing, first groove means in said slide valve for effecting communication between said third chamber and said fourth chamber when said slide valve is in said water softening position, fourth conduit means in said housing in communication with said fourth chamber, fifth conduit means in said housing in communication with said third chamber, sixth conduit means in said housing in communication with said fourth and fifth conduit means for conducting water from said third and fourth chambers to a brine tank when said slide valve is in said water softening position, and seventh conduit means in communication with said fourth chamber for conducting softened water from said third chamber through said fourth chamber to an external source.

6. A regenerating valve as set forth in claim 5 including, third aperture means in said valve seat, motor means coupled to said slide valve for moving said slide valve from said water softening position wherein said first and second aperture means effect communication between said first and second chambers to a position wherein such communication is terminated and said first chamber is placed in communication with said fourth chamber through said first aperture means and said third aperture means in said valve seat and wherein said first groove means no longer effect said communication between said third and fourth chambers, to cause hard water from said source to pass through said fourth conduit means and said fifth conduit means and into said third chamber from whence it passes to said zeolite bed through said third conduit means, and venturi means mounted on said housing and bridging said fourth conduit means and said fifth conduit means with the throat of said venturi connected to said sixth conduit means to draw brine through said sixth conduit means and into said third chamber for passage through said zeolite bed.

7. A regenerating valve as set forth in claim 6 including second groove means in said slide valve, a fifth chamber in said housing, said second groove means effecting communication between said second chamber and said fifth chamber when said slide valve is in said regenerating position with said first and third aperture means effecting communication between said first chamber and said fourth chamber, to cause water passing from said third chamber and through said zeolite bed through said third conduit means to pass to said fifth chamber through said second conduit means and said second chamber, and eighth conduit means in said housing for conducting said water from said fifth chamber to a source external of said housing for disposal.

8. A regenerating valve as set forth in claim 7 wherein said motor means comprises a piston and cylinder, solenoid operated pilot valve means for selectively effecting communication between said first chamber and a first face of said piston, said piston having a second face which is smaller than said first face, said second face also being in communication with said first chamber, so that the effecting of communication between said first chamber and said first face of said piston will effect the required movement of said piston to move said slide valve from its water softening position to said regeneration position, said movement being effected because of the differential areas of said first and second surfaces of said piston notwithstanding that said first and second surfaces of said piston are both in communication with said first chamber.

9. Water softening apparatus comprising a brine tank having a cover thereon, an aperture in said cover, a zeolite tank of smaller dimension than said brine tank and having its upper portion extending through said aperture in said cover, a perforate base in said brine tank for supporting the bottom of said zeolite tank and for carrying salt pellets thereon, means for elevating said base above the bottom of said brine tank, said zeolite tank extending through said base, said base having means in alignment with the aperture in said cover for positioning the zeolite tank, a regenerating valve mounted on the top of said zeolite tank above said cover of said brine tank whereby access may be had to said regenerating valve without necessitating removal of said cover of said brine tank, a brine valve located in said brine tank, conduit means extending between said brine valve and said regenerating valve, a tubular member extending vertically in said brine tank and having portions both below and above said base, float means mounted in said tubular member above said base, means coupling said float means to said brine valve for terminating flow of water through said conduit means when the water reaches a predetermined level in said brine tank above said base, said tubular member preventing said salt pellets from interfering with operation of said float means, fastening means for affixing said upper portion of said tubular member to said brine tank, and aperture means in said base for permitting said lower portion of said tubular member to extend through said base to thereby permit the lower portion thereof to lie below said base, said aperture means in conjunction with said fastening means serving to maintain said tubular member in an upright position within said brine tank.

References Cited

UNITED STATES PATENTS

| | | | |
|---|---|---|---|
| 2,670,328 | 2/1954 | Webb | 210—190 X |
| 2,704,554 | 3/1955 | Russell et al. | 137—625.29 |
| 2,716,422 | 8/1955 | Whitlock | 210—190 X |
| 2,744,867 | 5/1956 | Webb | 210—190 X |
| 2,920,644 | 1/1960 | Schulze et al. | 137—423 X |
| 2,959,541 | 11/1960 | Cleary | 210—191 X |
| 2,976,701 | 3/1961 | Greenawalt | 137—625.29 X |
| 3,044,626 | 7/1962 | Rose | 210—191 X |
| 3,080,975 | 3/1963 | Rose | 210—191 X |
| 3,083,728 | 4/1963 | Schulze et al. | 210—191 X |
| 3,089,508 | 5/1963 | Schulze et al. | 210—191 X |
| 3,095,005 | 6/1963 | Thompson | 210—191 X |
| 3,126,907 | 3/1964 | Tischler et al. | 137—399 |
| 3,154,484 | 10/1964 | Stoner | 210—191 X |
| 3,181,564 | 5/1965 | Rudelick | 210—190 X |
| 3,202,174 | 8/1965 | Rudelick | 210—190 X |
| 3,208,471 | 9/1965 | Olsen | 210—190 X |
| 3,215,273 | 11/1965 | Kryzer | 210—191 X |
| 3,233,732 | 2/1966 | Lung et al. | 210—191 X |
| 3,249,122 | 5/1966 | Fleckenstein et al. | 137—625.29 |
| 3,335,752 | 8/1967 | Hiers et al. | 210—190 X |

FOREIGN PATENTS 849,080   8/1939   France.

REUBEN FRIEDMAN, *Primary Examiner.*

SAMIH N. ZAHARNA, *Examiner.*

C. DITLOW, *Assistant Examiner.*